US008725351B1

(12) United States Patent
Selden et al.

(10) Patent No.: US 8,725,351 B1
(45) Date of Patent: May 13, 2014

(54) ACTIVE SUSPENSION SYSTEM

(71) Applicants: Brian Selden, Boston, MA (US); Antonio Sangermano, Rindge, NH (US)

(72) Inventors: Brian Selden, Boston, MA (US); Antonio Sangermano, Rindge, NH (US)

(73) Assignee: Bose Corporation, Framingham, MA (US)

( * ) Notice: Subject to any disclaimer, the term of this patent is extended or adjusted under 35 U.S.C. 154(b) by 50 days.

(21) Appl. No.: 13/664,540

(22) Filed: Oct. 31, 2012

(51) Int. Cl.
*B60G 17/018* (2006.01)

(52) U.S. Cl.
USPC ............... 701/37; 701/36; 701/38; 701/49; 280/5.5; 280/5.515; 267/140.11; 362/286; 318/672

(58) Field of Classification Search
USPC ............... 318/672, 673; 701/36, 37, 38, 49; 280/5.5, 5.515, 5.507, 5.508, 5.512; 267/140.11, 140.15, 140.5, 136, 267/140.14; 73/578; 362/286
See application file for complete search history.

(56) References Cited

U.S. PATENT DOCUMENTS

| 3,701,499 | A | 10/1972 | Schubert et al. |
| 4,981,309 | A | 1/1991 | Froeschle et al. |
| 6,460,803 | B1 | 10/2002 | Kiss et al. |
| 6,926,288 | B2 | 8/2005 | Bender |
| 8,095,268 | B2 * | 1/2012 | Parison et al. ............... 701/37 |
| 8,112,198 | B2 | 2/2012 | Parison, Jr. et al. |
| 2006/0095180 | A1 | 5/2006 | Ummethala et al. |
| 2006/0261647 | A1 * | 11/2006 | Maas et al. ............... 297/216.1 |

* cited by examiner

*Primary Examiner* — Antony M Paul
(74) *Attorney, Agent, or Firm* — Brian M. Dingman; Dingman IP Law, PC

(57) ABSTRACT

An active suspension system for a suspended device. The system has an electromagnetic actuator that produces force on the suspended device and that is powered by a power source, and a control system that provides control signals that cause the electromagnetic actuator to exert force on the suspended device. The control system is adapted to receive a turn-off signal that results in disabling the electromagnetic actuator from producing force on the suspended device. When the control system receives a turn-off signal it provides actuator turn-off control signals that cause the force exerted by the electromagnetic actuator to progressively transition to zero over a transition time period.

19 Claims, 3 Drawing Sheets

ACTIVE SUSPENSION SYSTEM

FIELD

This disclosure relates to an active suspension system.

BACKGROUND

Active suspension systems are used to counteract unwanted motions of a sprung mass. One such sprung mass is the seat of a motor vehicle. Drivers can experience significant fatigue due to constant seat vibration. Other motions of the seat can also be uncomfortable or even dangerous. Fatigue and seat-motion related issues can be lessened with an active suspension system that reduces seat vibration and other unwanted motions of the seat.

SUMMARY

An active suspension system can be used to counteract unwanted motions of a vibration isolation platform and any elements that are coupled to the platform. An active suspension system uses one or more electromagnetic actuators that can provide an essentially linear output motion to help accomplish a desired suspension result. Examples of such electromagnetic actuators include linear motors and rotary motors that drive a transmission mechanism that converts rotary motion to linear motion. The electromagnetic actuators are typically supplied with energy from an existing electrical power source. In a vehicle or other conveyance, the energy source is typically the existing vehicle battery.

Some such active suspension systems, for example truck seat active suspension systems, use a bias force eliminator such as a dynamically adjustable low stiffness spring element (in which the spring constant is adjustable) to keep the suspension centered in its vertical travel, and an electromagnetic actuator such as a linear motor to counteract vibration and other sources of minor vertical accelerations. These suspension systems draw quite a bit of energy from the power source (e.g., the truck battery). Accordingly, it is useful to disable the active suspension system (leaving the passive suspension system operational when one is available) when the conveyance isn't running. If the power being supplied to the actuator is shut off when it is in the process of being actuated to deliver force to the sprung mass, the sudden cessation of force can cause the sprung mass (e.g., the seat) to lurch; this motion can excite vibration modes (the passive suspension fundamental resonance and other structural modes) resulting in unwanted resonant vibration and possibly noise.

One aspect of the disclosure relates to the monitoring of the source (e.g., battery) voltage directly, or indirectly via the wiring that connects the power source to the active suspension system, as a means of determining when the conveyance is off, and then shutting off the electromagnetic actuator and/or the entire active suspension system. Other manners of monitoring whether the conveyance is on include monitoring for vibrations of the floor of the conveyance caused by the engine, and monitoring whether the suspended platform or elements that are carried by the platform such as a passenger seat is experiencing vertical motion of at least a minimum level.

Another aspect relates to control of the shutdown of the electromagnetic actuator such that its force output progressively drops to zero over a short time period, so as to gently cease operation and inhibit a sudden lurch that could result from a sudden cessation of force. In one non-limiting example, the progressive drop of the force output is essentially a monotonic decrease.

The disclosure features in one example an active suspension system for a suspended device. The system has an electromagnetic actuator that produces force on the suspended device and that is powered by a power source, and a control system that provides control signals that cause the electromagnetic actuator to exert force on the suspended device; the control system is adapted to receive a turn-off signal that results in disabling the electromagnetic actuator from producing force on the suspended device. When the control system receives a turn-off signal it provides actuator turn-off control signals that cause the force exerted by the electromagnetic actuator to progressively transition to zero over a short transition time period. The suspended device may be a motor vehicle passenger seat and the electromagnetic actuator may be a linear motor.

The transition time period may be predetermined. The turn-off control signals may be such so as to cause the force output of the electromagnetic actuator to smoothly transition to zero over the predetermined time period; the turn-off control signals may smoothly ramp the force output to zero over the predetermined time period. The turn-off control signals may alternatively essentially monotonically decrease the force output to zero over the predetermined time period.

The turn-off signal may be derived from suspension system sensors. The sensors may comprise one or more of a power source voltage sensor, a current sensor, a vibration sensor, and a suspended device position sensor. A turn-off signal may be generated upon one or more of the following conditions: (i) when the power source voltage is below a threshold voltage, (ii) when the average vibration is at or near zero, and (iii) when the position sensor senses a suspension velocity below a minimum velocity limit.

Featured in another example is an active suspension system for a suspended device comprising an electromagnetic actuator that produces force on the suspended device and that is powered by a power source, and a control system that provides control signals that cause the electromagnetic actuator to exert force on the suspended device, wherein the control system is adapted to receive a turn-off signal that results in disabling the electromagnetic actuator from producing force on the suspended device. The turn-off signal is derived from suspension system sensors that comprise one or more of a power source voltage sensor, a current sensor, a vibration sensor, and a suspended device position sensor. A turn-off signal is generated upon one or more of the following conditions: (i) when the power source voltage is below a threshold voltage, (ii) when the average vibration is at or near zero, and (iii) when the position sensor senses a suspension velocity below a minimum velocity limit.

The voltage sensor may be enabled to sense power source voltage only when the suspension system and the suspended device together are drawing less than a predetermined amount of electrical current. A turn-off signal may be generated only if the power source voltage remains below the threshold voltage for at least a predetermined amount of time. The threshold voltage may be predetermined and fixed, or the threshold voltage may be variable and based on past operation of the power source. The voltage sensor may be adapted to estimate the impedance of the wiring that conducts power from the power source to the electromagnetic actuator, measure the electrical current flowing in the wiring, and derive the voltage from the impedance and current.

The suspended device may be a seat in a motor vehicle that has a floor, and the vibration sensor may be mounted so as to sense vibrations of the motor vehicle floor. The sensed vibrations may be in a predetermined frequency range. The predetermined frequency range may be related to the engine rpm. A turn-off signal may be generated if the suspension velocity remains below the minimum velocity limit for at least a predetermined amount of time.

Other features and advantages will become apparent from the following description and claims.

DETAILED DESCRIPTION

It is desirable to control an active suspension system for a vehicle seat that includes an electromagnetic actuator driven using power drawn from the vehicle battery, so that the actuator does not continue to draw power once the vehicle engine has been shut off. Also, when it is desired to shut off the active suspension system, excitation of vibration modes can be reduced or minimized by controlling the force output of the system actuator for a predetermined amount of time as the system shuts down. For example, the force output can be controlled by progressively transitioning the force output to zero over a short predetermined time period once a trigger to shut down the system has occurred.

Figure 1:
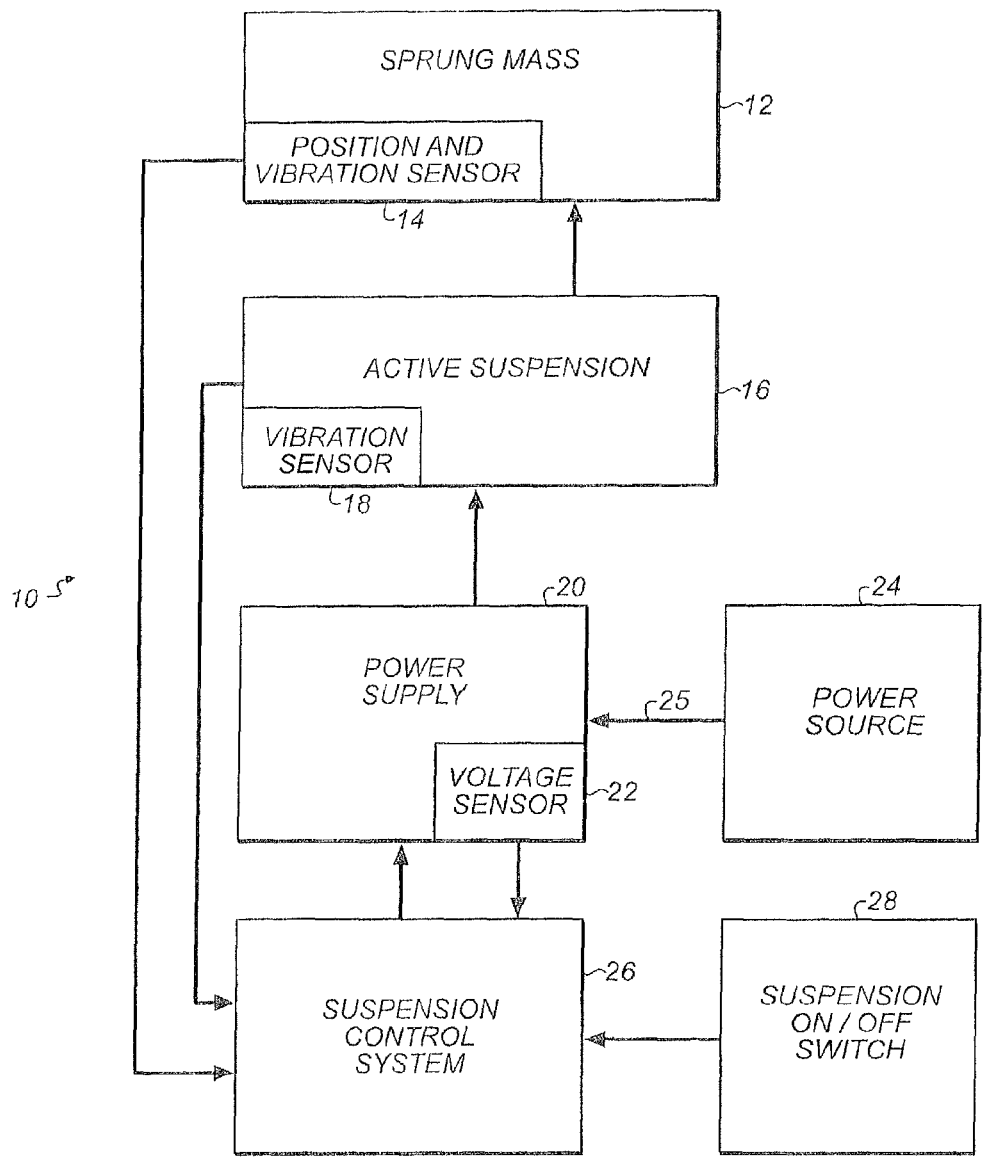
FIG. 1 is a block diagram of an active suspension system.

FIG. 1 is a schematic block diagram of active suspension system 10. Active suspension system 10 comprises active suspension 16, power supply 20, suspension control system 26 and user-activated switch 28. System 10 is used with sprung mass 12. Sprung mass 12 is typically any device that is coupled to a moving platform and is actively suspended with a suspension element that is controlled to achieve a particular suspension result. In one non-limiting example, the sprung mass is a device that is part of or carried by a moving platform such as a motor vehicle, train, airplane, boat or other means of conveyance that moves along (or below) the ground, or through the air or in or on the water and in which the device is suspended relative to the moving platform and the suspension system is active rather than purely passive.

An active suspension includes an actuator that is capable of outputting an arbitrary force. One particular non-limiting example of a sprung mass is a seat for the driver of a truck, with an active suspension that in part is designed to cancel or at least minimize the seat vibrations caused by the running engine and by movement of the truck over roadways. In this case, active suspension 16 typically comprises an electromagnetic actuator that can be but need not be a linear motor, as well as a dynamically adjustable low-stiffness spring that is used as a force bias eliminator to maintain the system at equilibrium such that the linear motor is used primarily to counteract small perturbations. An active suspension system is further detailed in U.S. Pat. No. 8,095,268, the disclosure of which is incorporated herein by reference.

Active suspension 16 has one or more electrically-operated suspension elements that are energized by electrical power derived from power source 24. In the example of a truck seat top as sprung mass 12, power source 24 is typically the truck battery and alternator in combination. Sprung mass 12 also typically includes a vibration sensor that is tied into control system 26 as part of the vibration control feedback loop; the sensor could be mounted to the seat top or to the part of the suspension that the seat top mounts to. Power supply 20 is part of system 10 and is coupled to power source 24 via high current capacity wiring 25. In one example, system 10 can be designed as an after-market product that is self-contained and is tied into the vehicle's electrical system only by power lines that are capable of carrying relatively high current, which is commonly on the order of 4 amps with a peak current on the order of 40 amps. By only requiring a connection to the vehicle power supply, installation of an aftermarket device is greatly simplified. No connection to the vehicle bus is needed which enables a single aftermarket device to be used across a wide range of vehicle platforms, as minimal customization to interface with the vehicle (e.g., particular electrical connectors and seat mounting brackets) is necessary. In another example system 10 is offered as an OEM product and so is readily tied into the vehicle ignition system; in this case system 10 will receive shutoff signals directly from the vehicle ignition system rather than having to derive vehicle shutoff as described herein.

Because the active suspension system can draw a considerable amount of energy, it is useful to arrange the system such that active suspension 16 is shut down (powered off) when the motor vehicle is not running. However, since the suspension system 10 is not electrically coupled to the existing truck electrical system other than drawing energy from the battery, the shutdown decision cannot be based on sensing the position of the ignition switch or other existing indications of the operational state of the engine or the vehicle, as this information is not available to the suspension system.

Motor vehicles and other motor-driven conveyances that use a battery as part of a power source typically have an alternator or the like that is used to provide electrical power for the conveyance and to maintain the battery charge when the engine is operating. When the conveyance and its alternator are running, the battery voltage is maintained at a relatively high level, which is nominally the operating voltage (commonly 13.6 to 14.4 volts in most US automotive systems, for example). When the conveyance and its alternator are not operating, charge is drawn from the battery by the active suspension system and the battery voltage drops. Accordingly, the battery voltage is an indirect indicator of whether or not the engine (and thus the alternator) is running. System 10 can use measurement of the battery voltage as a means to determine whether to interrupt power provided to active suspension 16 by power supply 20.

Suspension control system 26 provides control signals that ultimately cause the electromagnetic actuator present in active suspension 16 to exert force on sprung mass 12. Control system 26 is adapted to receive a turn-off signal that results in disabling the electromagnetic actuator such that it no longer produces force on the suspended device. The turn-off signal can be provided by on/off switch 28 which is a user-operated switch that can be built into suspension system 10. The turn-off signal can also be generated by system 10 itself upon the occurrence of one or more conditions that are indicative of whether or not the conveyance engine is running. One such condition is based on sensing of the battery voltage as described above. Another condition is based on sensed vibrations of the motor vehicle. A vibration sensor such as an accelerometer can be mounted so as to detect vibrations that are typically caused by a running engine. In one example, the accelerometer can be mounted directly or indirectly to the vehicle floor to which the seat is mounted. For example, the accelerometer can be mounted to the base of system 10 that is itself adapted to be bolted to the truck floor. Such a vibration sensor is schematically depicted as sensor 18. A third condition indicative of a dormant (stationary) conveyance is the position of the suspended device. A position sensor can be used to determine the position of the seat relative to the floor.

When the conveyance is in motion, vibrations will cause continuous motions of the seat or other suspended device that will be sensed by the position sensor and translated into suspension velocity. When the sensed velocity is below a minimum velocity limit, a decision can be made that the engine is off at which point power to suspension 16 can be cut off. The seat position and vibration sensors are schematically depicted as position and vibration sensors 14.

Voltage sensor 22 is part of power supply 20 and is enabled to sense the voltage of power source 24 via lines 25 and provide this information to control system 26. Alternatively, if the resistance is known or can be measured, the voltage can be determined by sensing the current and calculating the voltage. When significant power is being drawn from power source 24 to operate suspension 16, there can be a substantial voltage drop on line 25 that can make it difficult to sense the smaller voltage drop that is associated with the alternator having been turned off. Accordingly, system 10 can include a sensing device, circuitry or software that is adapted to determine the current flow. This can be accomplished as follows. Power supply 20 has a DC/DC converter that boosts the input nominal battery voltage to a higher output voltage used by the actuator that is part of active suspension 16. The converter can include a resistive element. The current can be measured by measuring the voltage drop over this resistive element. Alternatively, the converter can include a Hall Effect based current sensor or other sensing techniques to determine current.

Control system 26 can be enabled to use the power supply voltage measurement as an indicator of the state of the alternator when current flow is below a pre-determined level. In one example, this value can be about 4 amps. Some truck seats also include a resistive seat heating element (not shown) that can draw a substantial amount of current from power source 24 via line 25. In systems with this option, power supply 20 can be enabled to briefly interrupt the power to the seat heater while the power drawn by the active suspension is measured before the voltage drop is determined as an indicator of alternator state.

In order to increase the reliability of the voltage determination accomplished by voltage sensor 22, control system 26 can include an algorithm that low pass filters the battery voltage at about 5 Hz and uses a hysteretic comparator with an "alternator on" voltage threshold and a lower "alternator off" voltage threshold to prevent rapid switching between the on and off state decision. The output of this comparator can then be low pass filtered and subjected to a second hysteretic comparator that acts as a counter such that a state change between on and off is recognized only if the value remains for at least a minimum amount of time, which can be selected as about 4 seconds. This algorithm thus helps to ensure that a low battery voltage level decision, which is deemed to be indicative of the alternator being off, is more robust.

Power supply 20 can have an amplifier fed with the up-converted power from battery 24 and that is controlled by signals output by a control unit (processor) in suspension control system 26. The voltage measurement described above is an input to this control unit which can generate a control signal that results in the power from power supply 20 to active suspension 16 being cut-off.

In place of using static pre-determined battery voltage thresholds for the on/off comparison as described above, control system 26 can be enabled to vary the voltage thresholds based on monitoring of operation of system 10 over time, via monitoring of the determination of battery voltage by voltage sensor 22. This can allow system 10 to make a more robust on/off decision based on system variables that affect the battery voltage such as alternator performance, state of the battery charge, ambient temperature and the like. As an example, the system could be originally designed with thresholds that take into account environmental conditions. In this condition the decision speed is robust but slow. Over time, the system can observe the battery voltage in the turned off state and the turned on state and use that data to tune the thresholds. With the newly-derived thresholds the decision speed could be greatly increased. For example, a system operated in the winter in Alaska would learn to use voltage levels that may be 100 mV higher than the initial threshold, and a system operated in the summer in Arizona would use voltage levels that may be 100 mV lower.

Another option for use of measured battery voltage to make the power cutoff on/off decision can be as follows. Instead of making a battery voltage measurement only when the current draw is relatively low, control system 26 could be enabled to make battery voltage measurements continuously on the fly by estimating the effective impedance of wiring 25 based on measurement of the relationship between current draw and measured battery voltage ($V_{meas}$). Then, the estimated impedance could be used to compensate for the voltage drop due to the current draw. This could be accomplished by deriving the battery voltage ($V_{batt}$) from the estimated impedance ($R_{est}$) and the measured current flow ($I_{meas}$) according to the formula $$V_{batt}=V_{meas}+I_{meas}*R_{est} \quad \text{(equation 1)}$$

where $$R_{est}=(dV_{meas}/dt)/(dI_{meas}/dt) \quad \text{(equation 2)}$$

The decision as to whether to cut power to active suspension 16 can alternatively or additionally be based on the output of truck floor vibration sensor 18 that is provided to control system 26. When the vehicle is on or off, there are significantly different acceleration signatures detected by sensor 18. When the vehicle is off, there will be little or no vibration whereas when the vehicle is on there is measurable vibration from the engine and/or the road. Control system 26 can be enabled to determine that the vehicle has been turned off when the average vibration is at or near zero. Alternatively, when the vibration level in a pre-determined frequency region (for example, at the frequency that the engine is rotating) changes to at or near zero, system 26 can decide that the vehicle has been turned off.

The on/off decision can additionally or alternatively be based on the sensor that measures the suspension position. When the vehicle is off, the steady state suspension velocity will be at or near zero. A time parameter can be applied to this measurement to account for common situations in which the vehicle might be at rest, for example if the vehicle is at a stop light or the like. In one implementation, the absolute value of suspension velocity would need to be less than 10 millimeters per second for more than 90 seconds for control system 26 to generate an actuator turn off control signal that disables power supply 20 from providing power to suspension 16.

Figure 2:
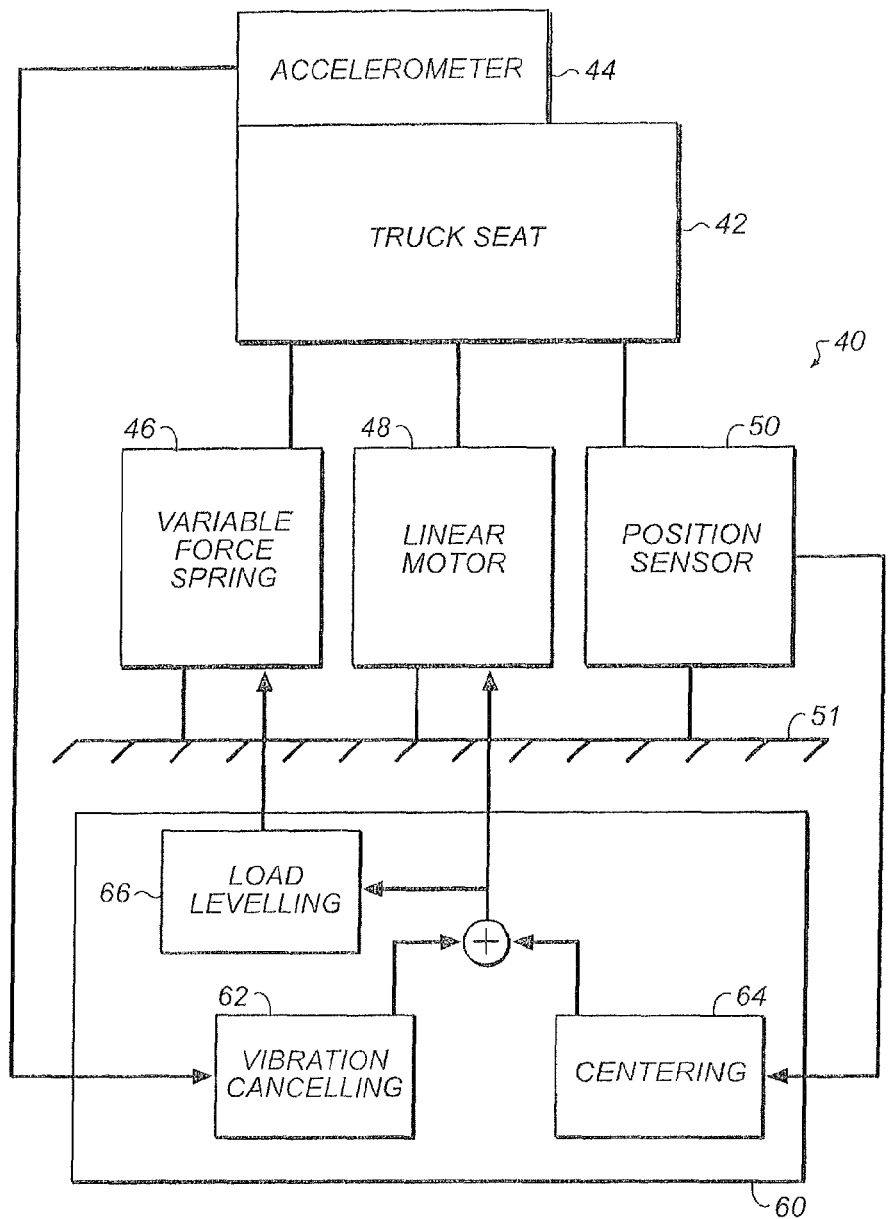
FIG. 2 is a block diagram of an active suspension system.

Truck seat suspension system 40 is schematically depicted in FIG. 2. Truck seat 42 has accelerometer 44 coupled to it. The active suspension system comprises dynamically adjustable variable force spring 46 and electromagnetic actuator (linear motor) 48. Dynamically adjustable force spring 46 can be an air cylinder that acts as a force bias eliminator. Dynamically adjustable force spring 46 acts as a load leveling system whose goal is to reduce the average force to zero. This can be accomplished by changing the pressure of a pneumatic cylinder using electric solenoids. Solenoid valves that are coupled to the truck's compressed air system can be controlled to vary the position and spring constant to offset DC or very low frequency (less than about 1 Hz) force requirements. Position sensor 50 measures the position of truck seat 42 relative to truck floor 51. Vibration is induced in the truck cab floor 51 due to both operation of the truck engine and motion of the truck over a roadway. These motions are sensed using position sensor 50 that measures the relative position of the floor and the sprung mass (i.e., the driver and the seat) and accelerations of this sprung mass measured by accelerometer 44. The sensor data from the accelerometer is used to cancel vibrations, and the position sensor data is used to keep the system in about the middle of its suspension system range.

Control algorithm 60 has a vibration cancelling function that is input with sprung mass acceleration from accelerometer 44. Centering function 64 is input with sprung mass position information from sensor 50. These signals are combined, and the combined signal is provided to load leveling algorithm 66 that controls variable force spring 46. The combined signal is also provided to linear motor 48.

When the electrically-operated portion of the active suspension (in the example of FIG. 2 meaning linear motor 48) is shut down as described above, if the motor is in the process of applying force the force output will immediately change from its present value to zero. This abrupt change from a non-zero force to a zero force can induce broadband acceleration due to the cessation of force from motor 48. This high frequency acceleration to this resonant system can cause the mechanical structure (i.e., seat 42) to resonate for a short time before coming to rest. This can cause unwanted lurching of the seat and undesirable sounds.

Figure 3:
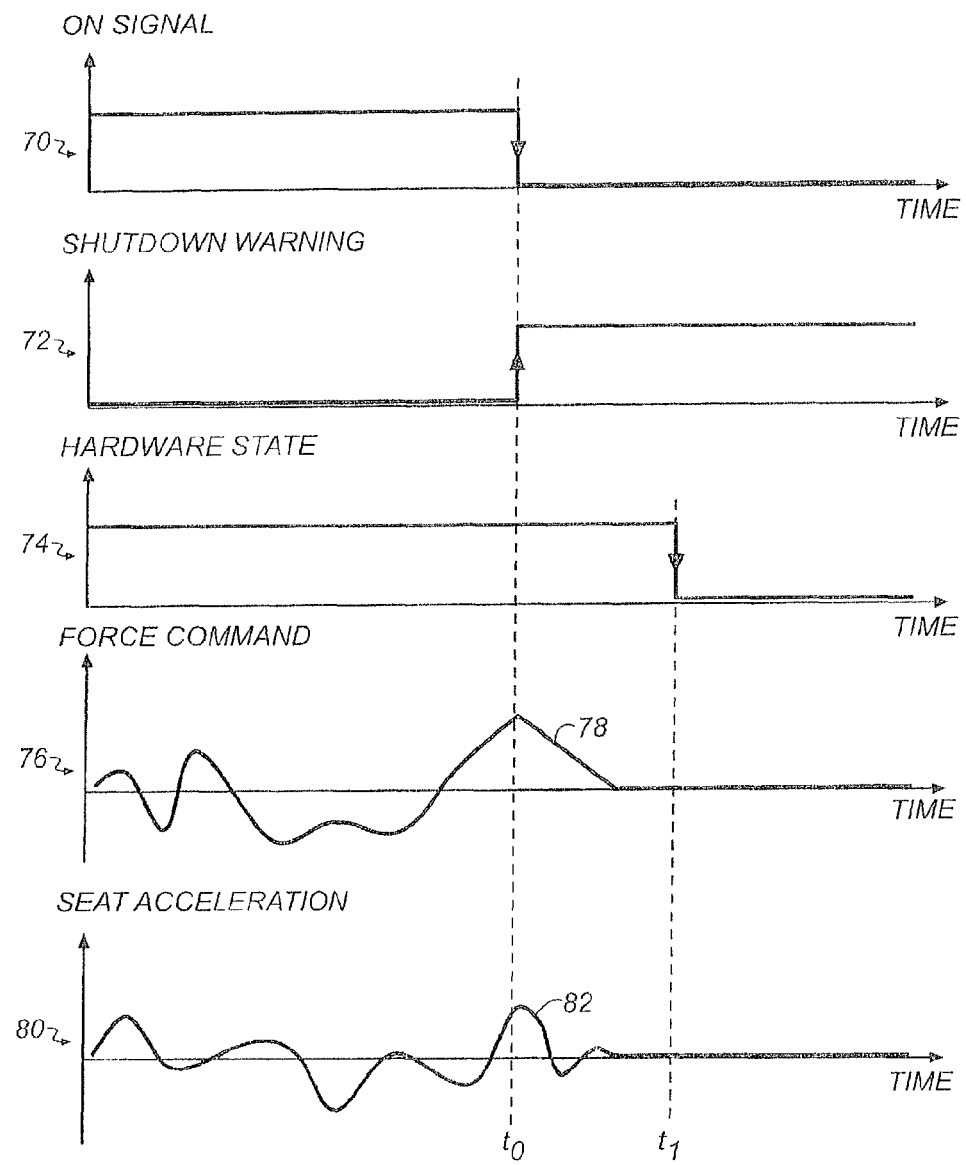
FIG. 3 illustrates operation of an active suspension system.

The active suspension system herein can be operated so as to minimize or eliminate this high frequency acceleration that causes the seat to resonate. This can be accomplished by progressively transitioning the linear motor from its present force value to zero over a short time period after the receipt or generation of an active suspension turn-off signal as described above. One example of this operation is illustrated in FIG. 3. The "on" signal 70, which comes from either the passenger via switch 28 or internally, turns off and thus causes the system to change state at time $t_0$. This causes a signal identified as "shutdown warning" 72 to change state (turn on). When this state change is recognized, the hardware state 74 is maintained for a short shutdown time (e.g., 50 milliseconds) represented as the time between time $t_0$ and time $t_1$.

The suspension control system in this case is enabled to progressively reduce its force command 76 from the present value linear motor force output (at time $t_0$) to a zero force output over some or all of this transitional time period. In the example shown, this transition is a smooth ramp 78 in the force output. The resulting seat acceleration 80 during the transition is shown in portion 82. The resulting acceleration is smoothed, and high frequency accelerations are minimized. After time $t_1$, the hardware is turned off and no power is provided to linear motor 48. Because the force command is already at zero, there are no undesirable transients.

What is claimed is:

1. An active suspension system for a suspended device, comprising:
   an electromagnetic actuator that produces force on the suspended device and that is powered by a power source; and
   a control system that provides control signals that cause the electromagnetic actuator to exert force on the suspended device, wherein the control system is adapted to receive a turn-off signal that results in disabling the electromagnetic actuator from producing force on the suspended device;
   wherein when the control system receives a turn-off signal it provides actuator turn-off control signals that cause the force exerted by the electromagnetic actuator to progressively transition to zero over a transition time period.

2. The active suspension system of claim 1 wherein the transition time period is predetermined.

3. The active suspension system of claim 2 wherein the turn-off control signals cause the force exerted by the electromagnetic actuator to smoothly transition to zero over the predetermined time period.

4. The active suspension system of claim 3 wherein the turn-off control signals cause the force exerted by the electromagnetic actuator to smoothly ramp to zero over the predetermined time period.

5. The active suspension system of claim 2 wherein the turn-off control signals cause the force exerted by the electromagnetic actuator to essentially monotonically decrease to zero over the predetermined time period.

6. The active suspension system of claim 1 wherein the turn-off signal is derived from suspension system sensors.

7. The active suspension system of claim 6 wherein the sensors comprise one or more of a power source voltage sensor, a current sensor, a vibration sensor, and a suspended device position sensor.

8. The active suspension system of claim 7 wherein a turn-off signal is generated upon one or more of the following conditions:
   (i) when the power source voltage is below a threshold voltage;
   (ii) when the vibration sensor senses an average vibration at or near zero; and
   (iii) when the position sensor senses a suspension velocity below a minimum velocity limit.

9. The active suspension system of claim 1 wherein the suspended device is a motor vehicle passenger seat and the electromagnetic actuator is a linear motor.

10. An active suspension system for a suspended device, comprising:
    an electromagnetic actuator that produces force on the suspended device and that is powered by a power source;
    a control system that provides control signals that cause the electromagnetic actuator to exert force on the suspended device, wherein the control system is adapted to receive a turn-off signal that results in disabling the electromagnetic actuator from producing force on the suspended device;
    wherein the turn-off signal is derived from suspension system sensors that comprise one or more of a power source voltage sensor, a current sensor, a vibration sensor, and a suspended device position sensor; and
    wherein a turn-off signal is generated upon one or more of the following conditions:
    (i) when the power source voltage is below a threshold voltage;
    (ii) when the vibration sensor senses an average vibration at or near zero; and
    (iii) when the position sensor senses a suspension velocity below a minimum velocity limit.

11. The active suspension system of claim 10 wherein the voltage sensor is enabled to sense power source voltage only when the suspension system and the suspended device together are drawing less than a predetermined amount of electrical current.

12. The active suspension system of claim 11 wherein a turn-off signal is generated only if the power source voltage remains below the threshold voltage for at least a predetermined amount of time.

13. The active suspension system of claim 10 wherein the threshold voltage is predetermined and fixed.

14. The active suspension system of claim 10 wherein the threshold voltage is variable and is based on past operation of the power source.

15. The active suspension system of claim 10 wherein the voltage sensor is adapted to estimate the impedance of the wiring that conducts power from the power source to the electromagnetic actuator, measure the electrical current flowing in the wiring and derive the voltage from the impedance and current.

16. The active suspension system of claim 10 wherein the suspended device is a seat in a motor vehicle that has a floor, and the vibration sensor is mounted so as to sense vibrations of the motor vehicle floor.

17. The active suspension system of claim 16 wherein the sensed vibrations are in a predetermined frequency range.

18. The active suspension system of claim 17 wherein the predetermined frequency range is related to the engine rpm.

19. The active suspension system of claim 10 wherein a turn-off signal is generated if the suspension velocity remains below the minimum velocity limit for at least a predetermined amount of time.

* * * * *